United States Patent
Halvorson et al.

(10) Patent No.: US 6,273,521 B1
(45) Date of Patent: Aug. 14, 2001

(54) ELECTRONIC AIR BRAKE CONTROL SYSTEM FOR RAILCARS

(75) Inventors: David H. Halvorson, Cedar Rapids; Dennis W. Sutherland, Marion, both of IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/127,409

(22) Filed: Jul. 31, 1998

(51) Int. Cl.$^7$ ....................................... B60T 13/00
(52) U.S. Cl. ....................................... 303/7; 303/3
(58) Field of Search ............................ 303/3, 7, 15, 20

(56) References Cited

U.S. PATENT DOCUMENTS

| | | | |
|---|---|---|---|
| 4,057,904 | * 11/1977 | Vrabel et al. | 33/125 R |
| 5,361,070 | 11/1994 | McEwan | 342/21 |
| 5,457,394 | 10/1995 | McEwan | 324/642 |
| 5,510,800 | 4/1996 | McEwan | 342/387 |
| 5,512,834 | 4/1996 | McEwan | 324/642 |
| 5,603,556 | 2/1997 | Klink | 303/22.6 |
| 5,630,216 | 5/1997 | McEwan | 455/215 |
| 5,738,417 | * 4/1998 | Wood et al. | 303/7 |
| 5,820,226 | * 10/1998 | Hart | 303/7 |
| 5,995,737 | * 11/1999 | Bonissone et al. | 395/500.29 |

* cited by examiner

Primary Examiner—Matthew C. Graham
(74) Attorney, Agent, or Firm—McGuireWoods LLP

(57) ABSTRACT

An electronic air brake control system which utilizes an inter-car distance measuring sensor for determining the distance between adjacent railcars and thereby determining the coupling slack and also determining the performance and response of railcar brake applications. The system providing the capability of controlling the slack to increase or decrease slack at a controlled rate and further for monitoring and regulating the amount of pneumatic brake signal required to produce a predetermined level of wheel resistance, together with a system and method for applying railcar brakes when predetermined characteristics relating to distance between cars and rate of change of distance between cars meets predetermined characteristics.

35 Claims, 2 Drawing Sheets

ELECTRONIC AIR BRAKE CONTROL SYSTEM FOR RAILCARS

BACKGROUND OF THE INVENTION

The present invention generally relates to railroad control systems and more particularly relates to braking systems for railcars, and even more particularly relates to electronically controlled pneumatic (ECP) railcar brake systems.

In the past, railcar brake systems have utilized a pneumatic brake system in which pneumatic brake control signals are sent along an air pipe extending the length of the train. While this system has been used extensively for many years, it has several drawbacks, including those arising out of delayed brake application at the rear of the train owing to the slow propagation of the pneumatic control signals through the air pipe. With the advent of electronically controlled pneumatic braking systems, very fast electrical signals can be used to activate all of the brakes on all of the cars simultaneously. This has the beneficial capability of reducing train stopping distances. However, the ECP brake systems continue to exhibit some of the problems from the early completely pneumatically controlled systems. For example, differences in braking performance from railcar to railcar can cause changes in the slack between railcars and thereby create a potential for damage to the train, its cargo and the track especially when there are rapid changes in the slack between each railcar.

Consequently, there exists a need for improved electronic-controlled pneumatic brake systems for railcars which tend to reduce the potential for damage to a train, its cargo and the track when railcars impart potentially destructive forces on adjacent railcars.

SUMMARY OF THE INVENTION

It is an object of the present invention to provide an electronic-controlled pneumatic braking system for railcars which reduces unwanted inter-car forces.

It is a feature of the present invention to include a distance measuring device for measuring distance between railcars.

It is an advantage of the present invention to utilize inter-car distance and velocity information in the process of controlling the application of railcar brakes.

It is another feature of the present invention to control bunching of train slack during braking with a controlled rate of change.

It is yet another feature of the present invention to include controlled stretching of train slack during braking with a controlled rate of change.

It is still another feature of the present invention to include smart electronic brake systems that learn from prior brake applications.

It is still yet another feature of the present invention to include a system and apparatus for displaying to a locomotive engineer absolute and trend information relating to train slack.

It is another advantage of the present invention to decrease railcar and track damage which would otherwise arise from imprecise application of railcar brakes.

It is yet another advantage of the present invention to decrease freight damage by reducing the shock forces induced upon railcars when uncontrolled changes in train slack occur.

It is another advantage of the present invention to positively affect brake shoe wear.

It is yet another advantage of the present invention to decrease train noise which would otherwise result when railcars bang into each other during braking processes.

The present invention is a method and apparatus for controlling electronic air brakes which is designed to satisfy the aforementioned needs, achieve the above-mentioned objects, include the herein described features and achieve the already articulated advantages. The invention is carried out in a controlled slack change system in the sense that uncontrolled slack changes are dramatically reduced.

Accordingly, the present invention includes an electronically controlled pneumatic brake system of the type having a brake air line extending the length of a train and some means of electronic communication between the locomotive and the radars in the train, together with a distance measuring device disposed on at least one of the cars for determining distances between railcars in which the distance is used by an electronic control means to regulate the application of brakes on the railcar.

BRIEF DESCRIPTION OF THE DRAWINGS

The invention may be more fully understood by reading the following description of the preferred embodiments of the invention in conjunction with the appended drawings wherein.

DETAILED DESCRIPTION OF THE PREFERRED EMBODIMENT

Figure 1:
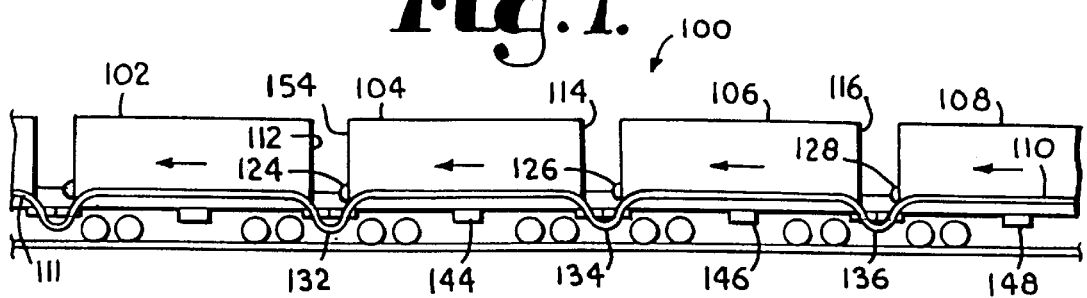
FIG. 1 is a block diagram of a segment of a train showing railcars having distance measuring equipment disposed thereon.

Now referring to the drawings, wherein like numerals refer to like matter throughout, and more particularly to FIG. 1, there is shown an ECP equipped train generally designated 100, having a first car 102, second car 104, third car 106, and a fourth car 108. The arrows drawn on cars 102–108 represent the direction of travel of the train. Interconnecting cars 102–108 is an air brie line 110 having inter-car flexible components which may be hoses or the like. Also interconnecting cars 102–108 is electrical power line 111, which has flexible inter-car segments 132, 134 and 136. Distance measuring sensors 124, 126 and 128 are disposed on cars 104, 106 and 108 respectively. The distance measuring sensors 124, 126 and 128 are utilized to precisely measure the distance between railcars. For example, distance measuring sensor 124 is utilized to precisely measure the distance from the front side 154 of car 104 to the back side 112 of car 102. As the mechanical couplings between the cars are stretched or compressed, slack between the cars can result in relative movement between cars. Distance measuring sensor 124 is provided to precisely measure the separation between cars.

Distance measuring sensor 124 may be any type of device which is capable of measuring the distance between railcars and generating a corresponding measurement signal, including but not limited to radars, ultrasonic, optical sensors, etc.

In one specific embodiment, the distance measuring sensor 124 is a radar type. One type of distance measuring sensor 124 is a Micropower Impulse Radar range finder as described in U.S. Pat. Nos. 5,361,070; 5,630,216; 5,457,394; 5,510,800; and 5,512,834 issued to Thomas E. McEwan and assigned to The Regents of the University of California. The preferred implementation of the radar operates utilizing very short pulses of Radio Frequency (RF) energy centered at 5.8 GHz. This frequency is preferred to operate the radar because:

This frequency band is currently available for low power devices to operate without a license from the FCC.

The wavelength of a signal in this band, is approximately 5.2 centimeters, which is small compared to the size of the target. (Lower frequency operation would result in wavelengths greater in length than the target size with significantly reduced reflection and resolution.)

The frequency is low enough to not be significantly affected by environmental conditions such as rain and snow.

A radar is preferred over other sensor technologies because it is less susceptible to environmental conditions such as rain, snow, dirt, etc. Acoustic and ultrasonic sensors are also affected to a small degree by temperature, barometric pressure, and humidity. These acoustic and other sensors are well known in the art and are discussed in U.S. Pat. 5,603,556 issued to Douglas D. Klink and assigned to Technical Services and Marketing, Inc.

The preferred scan rate of this type of radar for this usage is 38 cycles per second. A sample rate as low as 20 cycles per second may be used.

Electronic circuitry may be included in distance measuring device 124 which records the relative separation between the railcars during previous brake applications. The electronic circuitry could be of any type which would be sufficient to learn from prior brake applications to more accurately make the next brake application. Additionally, the device 124 may be capable of providing trend information relating to relative velocity differences of the railcars and the rate of change of slack.

Figure 2:
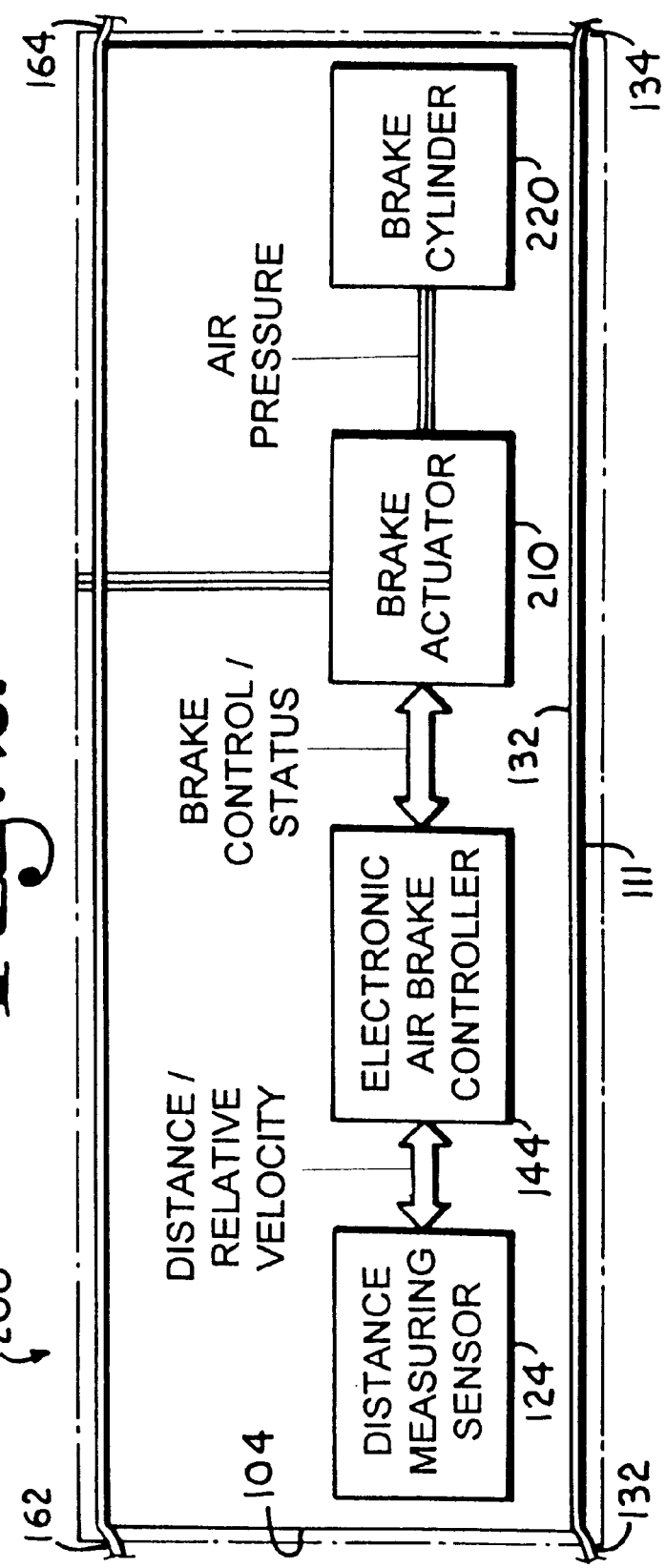
FIG. 2 is a block diagram of the brake control system of the present invention, which includes a segment of the air brake pipe which extends the length of the train, and a segment of the air brake control network which also extends the length of the train, together with the components of the system which would be located on each railcar. The blocks encircled by a dashed and dotted line represent those components of the system which are located on each railcar.

Now referring to FIG. 2, there is shown a system of the present invention generally designated 200 in which various components are shown enclosed in a dashed and dotted line representing that equipment located on board railcar 104. Included on railcar 104 is brake actuator 210 and brake cylinder 220, which are well known in the art.

The distance measuring sensor 124 may continuously generate distance and relative velocity reports to the electronic air brake controller 144. Controller 144 may electronically regulate the brake cylinder 220 by providing brake actuator 210 with brake control and status signals. A closed loop system is accomplished which can compensate for variations in braking performance by measuring the inter-car distances which are affected by the performance of the brake application. Once a closed loop brake control system is implemented, various operational features may be included to further enhance braking performance. In one embodiment, an instruction relating to controlled bunching of train slack during braking may be issued by a controller at a head end unit located in the locomotive. This head end unit may not only dictate the amount of train slack to be achieved, but also control the rate at which the train slack changes. Similarly, a head end unit may issue a braking command which is intended to control the stretching of train slack at a controllable rate of change.

Another operational feature of the present invention would be to reduce the number and severity of shock forces that occur when any car-to-car coupling switches to either a completely stretched or to a completely compressed state. The present invention will monitor the rate at which a coupling changes along the range from compressed to stretched and vice versa. Depending on the rate of change and the proximity of an approaching end of a range, the present invention can issue an electronic control signal to operate the brake at an appropriate level of braking effort.

Each railcar may be capable of recording the maximum and minimum separation distances which correspond to stretched and compressed slack statuses respectively. By making and recording such maxima and minima measurements, the electronic brake system is capable of learning the variations in available slack which may exist as a railcar is coupled with various different types of railcars. For example, the amount of slack between couplers is dependent not only upon the condition of the coupler with which the distance measuring device is associated, but also the coupler with which it couples on the immediately adjacent railcar. As these railcars are interchanged in a rail yard, the maximum and minimum slack associated with each car is variable. This learning of prior brake applications may be accomplished in many fashions which are a matter of designer's choice. For example, the distance measuring sensor 124 may be capable of storing and comparing various reports to effectively learn the appropriate slack ranges for each coupler combination. Additionally, the electronics and/or computation capability may be resident in the electronic air brake controller 144. Additionally, it is possible that if the appropriate information is transmitted on the inter-car power line 111, the learning of prior brake applications may be performed at a central location such as a head end unit. If such information is transmitted on the power line 111 in one embodiment of the present invention, a display of train slack information can be provided to the engineer by providing a video display in the locomotive which provides not only absolute slack information, but also the rate of change of train slack. This information may be valuable to the engineer to provide for more accurate control of the acceleration and deceleration of the train. The precise location of the processing capability for determining control and monitoring is a matter of designers' choice and hardware and software capable of adaptation for performing these functions is within the knowledge of persons skilled in the art. It is expected that various electronic components of the present invention may be dedicated circuits, and microprocessors or electronic resources which are shared for use with other train control functions.

In yet another operational feature, the present invention may be used to reduce the impact energy that often occurs in the process of coupling cars. For example, individual railcars frequently are rolled down a slight incline to gain enough momentum to couple with a stationary car. Often these cars will impact with inter-car forces far beyond what is necessary to effect the coupling. The distance measuring sensor 124 of the present invention could be used to apply the railcar's brake when it detects an excessive rate of closure with another railcar.

It should also be understood that while the train electrical power line 111 can provide power and a communication medium, it could be replaced with an RF link and power generation or power storage means located on each car.

It is thought that the method and apparatus of the present invention will be understood from the foregoing description and that it will be apparent that various changes may be made in the form, construction, steps and arrangement of the parts and steps thereof, without departing from the spirit and scope of the invention or sacrificing all of their material advantages. The form herein described being a preferred or exemplary embodiment thereof.

We claim:

1. An electronic air brake control system comprising:
a distance measuring sensor for measuring inter-car separation distances between adjacent railcars and recording the inter-car separation distances between the adjacent railcars during previous braking applications;
an electronic air brake controller electrically coupled to said distance measuring sensor, said electronic air brake controller learning variations in available slack between coupled railcars and generating an electronic control signal as a function of the inter-car measured distance and the recorded inter-car separation distances between the adjacent railcars during previous braking; and
a railcar air brake coupled to said electronic air brake controller, said railcar air brake applying a variable resistance to a railcar wheel in response to said electronic control signal received from the electronic air brake controller.

2. An electronic air brake control system of claim 1 wherein said electronic control signal is also provided in response to a command having a predetermined characteristic relating to a predetermined train slack configuration.

3. An electronic air brake control system of claim 2 wherein said predetermined train slack configuration relates to maximizing the train slack.

4. An electronic air brake control system of claim 2 wherein said predetermined train slack configuration relates to the minimizing of train slack.

5. An electronic air brake control system of claim 1 wherein said electronic control signal is provided in response to a relationship with a predetermined characteristic relating to the measured rate of change of inter-car distance.

6. An electronic air brake control system of claim 5 wherein said electronic control signal is further provided in response to a characteristic relating to an amount of slack existing between a current measured position and a railcar separation corresponding to a compressed state.

7. An electronic air brake control system of claim 6 wherein said distance measuring sensor is a radar.

8. An electronic air brake control system of claim 6 wherein said distance measuring system is an ultrasonic sensor.

9. An electronic air brake control system of claim 1 further comprising an inter-car electronic communication system for communicating electronic brake control signals between a railcar and a head end unit disposed on a locomotive.

10. An electronic air brake control system of claim 9 wherein said electronic communication system is an inter-car electrical line.

11. An electronic air brake control system of claim 10 further comprising a display device coupled to said electronic communication system and adapted to display train slack information to occupants of a locomotive.

12. An electronic air brake control system of claim 9 wherein said electronic communication system is a radio frequency link and electrical power is obtained from each car.

13. An electronic air brake control system of claim 9 further comprising a head end unit disposed on a locomotive and coupled to said inter-car electrical line, said head end unit adapted for receiving and using said distance measuring signal from a plurality of railcars to regulate a train slack configuration of said plurality of railcars.

14. An electronic air brake control system of claim 1 wherein said distance measuring sensor includes means for providing trend information relating to relative velocity differences of the adjacent railcars and a rate of change of slack between the adjacent railcars.

15. An electronic air brake control system of claim 14 wherein said electronic air brake controller provides an instruction relating to controlled bunching of train slack during the braking applications.

16. An electronic air brake control system of claim 1 further comprising a head end unit disposed on a locomotive which receives the electronic brake control signals.

17. An electronic air brake control system of claim 16 wherein said head end unit controls an amount of train slack to be achieved between the adjacent railcars.

18. An electronic air brake control system of claim 17 wherein said head end unit controls a rate of change of said train slack between the adjacent railcars.

19. An electronic air brake control system of claim 16 wherein said head end unit controls a stretching of said train slack at a predetermined rate between the adjacent railcars.

20. An electronic air brake control system of claim 16 wherein said head end unit reduces a number and severity of shock forces between the adjacent railcars that occur when car-to-car coupling switches to either a completely stretched state or a completely compressed state.

21. An electronic air brake control system of claim 20 wherein the head end unit monitors a rate at which a coupling changes along the range from (i) the completely stretched state to the completely compressed state or (ii) the completely compressed state to the completely stretched state.

22. An electronic air brake control system of claim 1 wherein the distance measuring sensor learns variations in train slack which exists as the adjacent railcars are coupled with one another.

23. An electronic air brake control system of claim 22 wherein the distance measuring sensor stores and compares various reports of the learned variations in the train slack.

24. An electronic air brake control system of claim 22 wherein the learned variations in the train slack are provided to the a head end unit.

25. An electronic air brake control system of claim 22 further comprising a display for displaying train slack information, the train slack information including absolute slack information and rate of change of the train slack.

26. An electronic air brake control system of claim 1 wherein the distance measuring sensor applies the braking applications in response to an excessive rate of closure between the adjacent railcars during coupling.

27. An electronic air brake control system of claim 1 wherein the distance measuring sensor continuously generates distance and relative velocity reports to the electronic air brake controller.

28. An electronic air brake control system comprising:
means for measuring inter-car separation distances which vary in response to changes in slack associated with mechanical inter-car couplers;
means for recording changes in the slack associated with the mechanical inter-car couplers during previous braking applications;
means for generating a pneumatic signal for controlling an air brake on a railcar in response to electronic brake control signals; and
means for generating said electronic brake control signals in response to the measured distance signal representative of said inter-car distances and the recorded changes in the slack associated with the mechanical inter-car couplers during the previous braking applications.

29. An electronic air brake control system of claim 28 further comprising means for electronic communication between railcars.

30. An electronic air brake control system of claim 29 further comprising:

means for effecting said electronic brake control signals in relation to a command to achieve a predetermined train slack configuration.

31. An electronic air brake control system of claim 30 wherein said predetermined train slack configuration relates to a fully stretched train.

32. An electronic air brake control system of claim 29 further comprising means for effecting said electronic brake control signal in relation to a rate of change of inter-car separation.

33. An electronic air brake control system of claim 32 wherein said means for measuring is an ultrasonic measuring apparatus.

34. A method of controlling the braking of a train comprising the steps of:

measuring inter-car separation distances;

recording the inter-car separation distances between adjacent railcars during previous braking applications;

generating a measured separation signal in response to the measured and the recorded inter-car separation distances; and applying air brakes on a railcar in response to said measured separation signal.

35. A method of claim 34 wherein said step of applying said air brakes is based upon a command to limit inter-car forces.

* * * * *